Dec. 17, 1963 R. P. DUMM 3,114,386
MANUAL LATCH TO RETRACT A PACKING ASSEMBLY
Filed Jan. 3, 1961 2 Sheets-Sheet 1

INVENTOR.
ROBERT P. DUMM,
BY
ATTORNEY

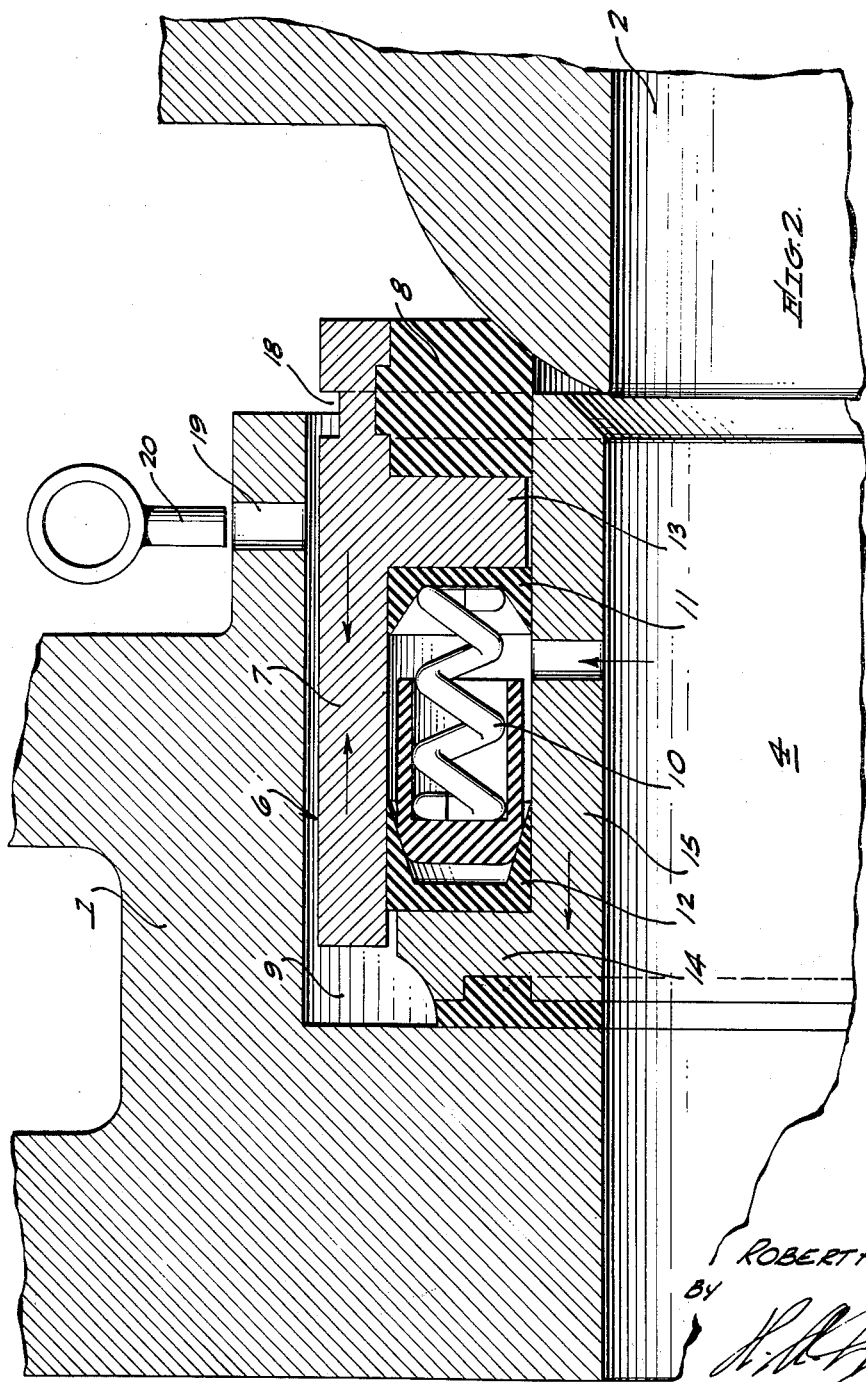

United States Patent Office 3,114,386
Patented Dec. 17, 1963

3,114,386
MANUAL LATCH TO RETRACT A PACKING ASSEMBLY
Robert P. Dumm, Long Beach, Calif., assignor to Pacific Valves, Inc., Long Beach, Calif., a corporation of California
Filed Jan. 3, 1961, Ser. No. 80,323
6 Claims. (Cl. 137—316)

This invention relates to a manual latch to retract a packing assembly, particularly for ball or globe type valves of the type where the ball or globe can be removed from the body of the valve through an appropriate opening in the top of the valve body.

An object of my invention is to provide a novel manual latch means which will hold the packing assembly in a retracted position when the ball or globe of the valve is to be removed for purposes of replacement or repair.

Another object is to provide a novel manual latch structure of the character stated, which is simple in construction and which will effectively hold a spring pressed packing assembly in a retracted position while the ball or globe of the valve is being removed or replaced.

Other objects, advantages and features of my invention may appear from the accompanying drawing, the subjoined detailed description and the appended claims.

In the drawing:

FIGURE 2 is a fragmentary vertical sectional view of the manual latch structure to retract the seal assembly.

Figure 1:
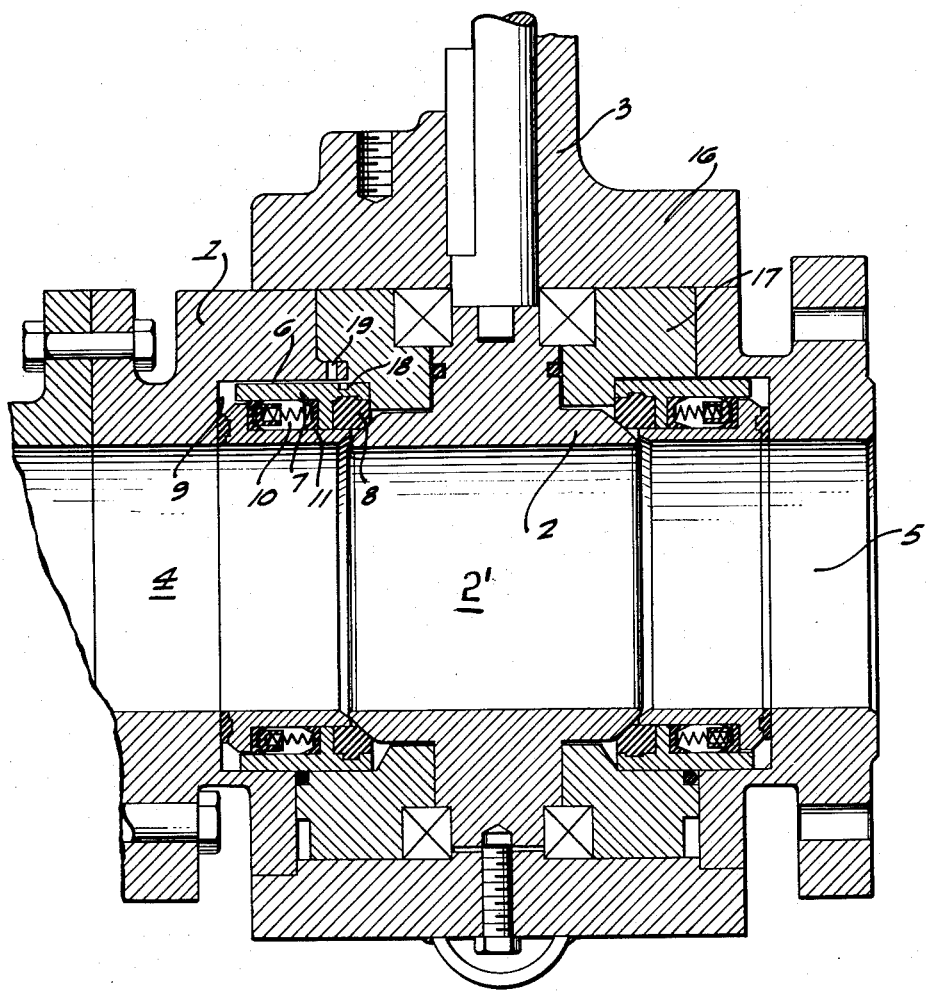
FIGURE 1 is a vertical sectional view of a ball or globe type valve embodying my invention.

Referring more particularly to the drawing, the numeral 1 indicates the body of a valve in which a ball 2 is rotatably mounted. The ball 2 is rotated by means of a stem 3 in the usual and well known manner of this type of valve. The body 1 of the valve is provided with the usual intake 4 and outlet 5 between which the ball 2 is mounted as shown; this ball being rotatable about its vertical axis to various positions. The ball 2 is provided with a passage 2′ extending therethrough, which passage can be moved into and out of registry with the intake and outlets 4, 5. To seal the ball 2 on the upstream and/or the downstream side, I provide a pressurized seal 6 which consists of a seal ring 7, at one end of which an appropriate seal ring 8 is mounted. The seal ring 8 is shaped to conform with the exterior surface of the ball 2. The center line of the seal ring 7 is concentric with the center line of the parts 4 and 5. The seal ring 8 is mounted in a suitable cavity 9 in the body 1 of the valve and is movable horizontally either towards or away from the ball 2. The seal ring 7 is pressed towards the ball 2 by either a suitable pressure means or by means such as the coil springs 10. The springs 10 may be mounted within the cavity 9 and may be positioned between a packing ring 11 and a second packing ring 12. The packing ring 11 bears against a shoulder 13 on the seal ring 7, and the packing ring 12 bears against a shoulder 14 of a sleeve 15 which is mounted within the cavity 9. Expansion of the spring 10 will thus press the ball seal 8 tightly against the ball 2 at all times, except when it is necessary to remove the ball 2 for purposes of replacement or repair.

When the ball 2 is to be removed from the body 1 of the valve, the cap 16 is removed as well as the packing holder 17. With these parts removed a large opening is provided in the top of the body 1 through which the ball 2 can be lifted. The only thing which is restraining the removal of the ball 2 is the tube seal assembly 6. To hold the tube seal assembly 6 in retracted position, I provide an annular groove 18 in the outer surface of the seal ring 7, which annular groove is adjacent the inner end of the seal ring. A hole 19 is provided in the body 1 of the valve and this hole is adjacent and spaced outwardly from the groove 18. When the cap 16 and the packing holder 17 are removed, the hole 19 is exposed and the seal ring 7 can now be pushed outwardly manually against the tension of the spring 10 until the groove 18 is aligned with the hole 19. At that time a latch pin 20 can be dropped into the hole 19 and into the groove 18, thus holding the seal ring 7 retracted with the packing or seal 8 held away from the ball 2 an amount sufficient to permit the ball 2 to be lifted out of the body 1 so that it may be repaired or replaced. So called top entry valves are in large commercial use, and this means of holding the spring pressed seal or packing assembly in a retracted position permits the ball 2 to be worked upon as required, and also the spring tensioning of the ball seal assembly is retained.

Having described my invention, I claim:

1. In a globe type valve including a body, a ball rotatably mounted in said body, said body having an intake and an outlet flow port therein, both of said ports extending to the ball, said body having an access opening adapted to pass said ball, said ball having a passage extending therethrough movable into and out of registry with said flow ports, said body having a cavity therein positioned adjacent one of said flow ports, a seal ring disposed about the associated port and mounted for limited movement in said cavity relative to said ball, one end of the seal ring slidably engaging the ball, spring means engaging the seal ring and pressing the ring against the ball, said seal ring and the body portion defining the other flow port preventing removal of the ball from the body, and latch means engageable with the seal ring to hold the seal ring away from the ball and against the tension of the spring means and provide sufficient clearance for removal of the ball from the body through said access opening.

2. In a globe type valve including a body, a ball rotatably mounted in said body, said body having an intake and an outlet port therein, both of said ports extending to the ball, said ball having a passage extending therethrough and movable into and out of registry with said intake and outlet ports, said body having an access opening adapted to pass said ball, said body having a cavity therein positioned adjacent each of the intake and outlet ports, a seal ring disposed about each of the ports and mounted for limited movement in the cavity relative to said ball, one end of each seal ring slidably engaging the ball, spring means engaging each seal ring and pressing the respective ring against the ball, said rings cooperating to prevent removal of the ball from the body, and latch means engageable with each seal ring to hold the respective seal ring away from the ball and against the tension of the spring means and provide sufficient clearance for removal of the ball from the body through said access opening.

3. In a globe type valve including a body, a ball rotatably mounted in said body, said body having an intake and an outlet flow port therein, both of said ports extending to the ball, said body having an access opening adapted to pass said ball, said ball having a passage extending therethrough movable into and out of registry with said flow ports, said body having a cavity therein positioned adjacent one of said flow ports, a seal ring disposed about the associated port and mounted for limited movement in said cavity relative to said ball, one end of the seal ring slidably engaging the ball, spring means engaging the seal ring and pressing the ring against the ball, said seal ring and the body portion defining the other flow port preventing removal of the ball from the body, said body having a hole therein extending to the seal ring, and a latch pin fitted in said hole engageable with the seal ring to hold the seal ring away from the ball and against the tension of the spring means and provide sufficient clearance for removal of the ball from the body through said access opening.

4. In a globe type valve including a body, a ball rotatably mounted in said body, said body having an intake and an outlet flow port therein, both of said ports extending to the ball, said body having an access opening adapted to pass said ball, said ball having a passage extending therethrough movable into and out of registry with said flow ports, said body having a cavity therein positioned adjacent one of said flow ports, a seal ring disposed about the associated port and mounted for limited movement in said cavity relative to said ball, one end of the seal ring slidably engaging the ball, spring means engaging the seal ring and pressing the ring against the ball, said seal ring and the body portion defining the other flow port preventing removal of the ball from the body, said body having a hole therein extending to the seal ring, said seal ring having an annular groove therein alignable with said hole in the retracted position of the seal ring, and a latch pin extending through the hole and into the groove to hold the seal ring away from the ball and against the tension of the spring means, and provide sufficient clearance for removal of the ball from the body through said access opening.

5. In a globe type valve including a body, a ball rotatably mounted in said body, said body having an intake and an outlet flow port therein, both of said ports extending to the ball, said body having an access opening adapted to pass said ball, said ball having a passage extending therethrough movable into and out of registry with said flow ports, said body having a cavity therein positioned adjacent one of said flow ports, a seal ring disposed about the associated port and mounted for limited movement in said cavity relative to said ball, one end of the seal ring slidably engaging the ball, spring means engaging the seal ring and pressing the ring against the ball, said seal ring and the body portion defining the other flow port preventing removal of the ball from the body, and latch means engageable with the seal ring to hold the seal ring away from the ball and against the tension of the spring means and provide sufficient clearance for removal of the ball from the body through said access opening, a sleeve fixedly mounted in the body and within said cavity, said seal ring being slidably mounted on the sleeve, said sleeve separating the seal ring from the associated port.

6. In a globe type valve including a body, a ball rotatably mounted in said body, said body having an intake and an outlet flow port therein, both of said ports extending to the ball, said body having an access opening adapted to pass said ball, said ball having a passage extending therethrough movable into and out of registry with said flow ports, said body having a cavity therein positioned adjacent one of said flow ports, a seal ring disposed about the associated port and mounted for limited movement in said cavity relative to said ball, one end of the seal ring slidably engaging the ball, spring means engaging the seal ring and pressing the ring against the ball, said seal ring and the body portion defining the other flow port preventing removal of the ball from the body, said body having a hole therein extending to the seal ring, said seal ring having an annular groove therein alignable with said hole in the retracted position of the seal ring, and a latch pin extending through the hole and into the groove to hold the seal ring away from the ball and against the tension of the spring means, and provide sufficient clearance for removal of the ball from the body through said access opening, a sleeve fixedly mounted in the body and within said cavity, said seal ring being slidably mounted on the sleeve, said sleeve separating the seal ring from the associated port.

References Cited in the file of this patent

UNITED STATES PATENTS

| 2,883,146 | Knox | Apr. 21, 1959 |
| 3,045,693 | Allen | July 24, 1962 |
| 3,047,024 | Schuller | July 31, 1962 |

FOREIGN PATENTS

| 195,794 | Austria | of 1957 |